(12) United States Patent
Kang

(10) Patent No.: US 9,720,276 B2
(45) Date of Patent: *Aug. 1, 2017

(54) LIQUID CRYSTAL DISPLAY PANEL AND DISPLAY APPARATUS USING THE SAME

(71) Applicant: SHENZHEN CHINA STAR OPTOELECTRONICS TECHNOLOGY CO., LTD., Shenzhen (CN)

(72) Inventor: Chihtsung Kang, Shenzhen (CN)

(73) Assignee: SHENZHEN CHINA STAR OPTOELECTRONICS TECHNOLOGY CO. LTD., Shenzhen (CN)

( * ) Notice: Subject to any disclaimer, the term of this patent is extended or adjusted under 35 U.S.C. 154(b) by 49 days.

This patent is subject to a terminal disclaimer.

(21) Appl. No.: 14/723,464

(22) Filed: May 28, 2015

(65) Prior Publication Data

US 2015/0261039 A1    Sep. 17, 2015

Related U.S. Application Data

(63) Continuation of application No. 13/522,957, filed as application No. PCT/CN2012/076079 on May 25, 2012, now Pat. No. 9,063,369.

(30) Foreign Application Priority Data

May 24, 2012    (CN) .......................... 2012 1 0163448

(51) Int. Cl.
   *G02F 1/1335*    (2006.01)
   *G02F 1/1337*    (2006.01)
   (Continued)

(52) U.S. Cl.
   CPC ...... *G02F 1/133528* (2013.01); *G02F 1/1393* (2013.01); *G02F 1/13363* (2013.01);
   (Continued)

(58) Field of Classification Search
   CPC .......... G02F 1/133528; G02F 1/13363; G02F 1/133753; G02F 1/134309; G02F 1/1393
   See application file for complete search history.

(56) References Cited

U.S. PATENT DOCUMENTS 7,023,516 B2 *   4/2006   Yoshida ................ G02F 1/1393
                                                          349/129
7,548,294 B2 *   6/2009   Ohmuro ................ G02F 1/1393
                                                          349/102

(Continued)

*Primary Examiner* — James Dudek
(74) *Attorney, Agent, or Firm* — Mark M. Friedman

(57) ABSTRACT

The present invention provides a liquid crystal display (LCD) panel and a display apparatus using the same. The LCD panel comprises a first substrate, a second substrate, a liquid crystal layer and a half wave ($\lambda/2$) retarder film, The liquid crystal layer is formed between the first substrate and the second substrate. The second substrate comprises a second electrode, wherein the second electrode comprises a trunk portion and plurality of branch portions, and there is a predetermined angle between the trunk portion and the branch portions, and the predetermined angle is less than or greater than 45 degrees. The $\lambda/2$ retarder film is bonded to an outer surface of the first substrate or the second substrate. The present invention can improve the color shift problem and the transmittance of the LCD panel.

7 Claims, 7 Drawing Sheets

(51) Int. Cl.
*G02F 1/1343* (2006.01)
*G02F 1/139* (2006.01)
*G02F 1/13363* (2006.01)

(52) U.S. Cl.
CPC .. *G02F 1/133753* (2013.01); *G02F 1/134309* (2013.01); *G02F 2001/133638* (2013.01); *G02F 2413/01* (2013.01); *G02F 2413/08* (2013.01)

(56) References Cited

U.S. PATENT DOCUMENTS

| | | | |
|---|---|---|---|
| 8,462,304 B2* | 6/2013 | Chen | G02F 1/133707 349/141 |
| 9,063,369 B2* | 6/2015 | Kang | G02F 1/133528 |
| 2004/0095536 A1* | 5/2004 | Yoshida | G02F 1/13363 349/117 |
| 2004/0125296 A1* | 7/2004 | Sasabayashi | G02F 1/134309 349/129 |
| 2005/0030447 A1* | 2/2005 | Hsu | G02F 1/13363 349/102 |
| 2006/0066776 A1* | 3/2006 | Isobe | G02F 1/13363 349/102 |
| 2008/0013018 A1* | 1/2008 | Jang | G02F 1/133555 349/102 |
| 2010/0026940 A1* | 2/2010 | Takegami | B29C 55/00 349/102 |
| 2011/0310335 A1* | 12/2011 | Hashimoto | G02F 1/133707 349/96 |

\* cited by examiner

LIQUID CRYSTAL DISPLAY PANEL AND DISPLAY APPARATUS USING THE SAME

FIELD OF THE INVENTION

The present invention relates to a field of a liquid crystal display technology, and more particularly to a liquid crystal display (LCD) panel and a display apparatus using the same.

BACKGROUND OF THE INVENTION

Liquid crystal displays (LCDs) have been widely applied in electrical products. Currently, most of LCDs are backlight type LCDs which comprise a liquid crystal panel and a backlight module. The liquid crystal panel is composed of two transparent substrates and a liquid crystal sealed therebetween.

At present, a vertical alignment (VA) technology has been developed for LCD panels. For example, a polymer stabilized vertical alignment (PSVA) type liquid crystal display panel which is made using a polymer-stabilized alignment (PSA) process, can have some advantages, such as wide viewing angle, high aperture ratio, high contrast and simple process.

In the PSVA type LCD, reactive monomers can be doped in the liquid crystal between the two transparent substrates and mixed with liquid crystal molecules, wherein the a polyimide (PI) is coated on the surface of each of the transparent substrates to be an alignment layer. Subsequently, when applying a voltage and irradiating an ultraviolet (UV) light to the two transparent substrates, a phase separation arises in the reactive monomers and the liquid crystal molecules, and a polymer is formed on the alignment layer of the transparent substrate. The liquid crystal molecules are oriented along a direction of the polymer due to the interaction between the polymer and the liquid crystal molecules. Therefore, the liquid crystal molecules between the transparent substrates can have a pre-tilt angle.

However, currently, a color shift problem is likely to occur in the VA type LCD, hence deteriorating the display quality of the LCD. For improving the above-mentioned color shift problem, a pixel structure of the LCD panel may be varied, but the variation of the pixel structure may result in a reduction of a transmittance of the LCD panel.

As a result, it is necessary to provide an LCD panel and a display apparatus using the same to solve the problems existing in the conventional technologies, as described above.

SUMMARY OF THE INVENTION

The present invention provides an LCD panel and a display apparatus using the same to solve the color shift problem and the transmittance problem of the VA type LCD.

A primary object of the present invention is to provide a liquid crystal display panel, and the liquid crystal display panel comprises: a first substrate comprising a first electrode; a second substrate comprising a second electrode, wherein the second electrode has a pixel electrode structure, and the pixel electrode structure comprises a trunk portion and plurality of branch portions, and there is a predetermined angle between the trunk portion and the branch portions, and the predetermined angle is in the range of 5 degrees to 85 degrees except 45 degrees; a liquid crystal layer formed between the first substrate and the second substrate; a first polarizer disposed at an outer side of the first substrate; a second polarizer disposed at an outer side of the second substrate; and a half wave ($\lambda/2$) retarder film bonded to an outer surface of the first substrate first substrate or the second substrate.

Another object of the present invention is to provide a liquid crystal display panel, and the liquid crystal display panel comprises: a first substrate comprising a first electrode; a second substrate comprising a second electrode, wherein the second electrode has a pixel electrode structure, and the pixel electrode structure comprises a trunk portion and plurality of branch portions, and there is a predetermined angle between the trunk portion and the branch portions, and the predetermined angle is less than or greater than 45 degrees; a liquid crystal layer formed between the first substrate and the second substrate; a first polarizer disposed at an outer side of the first substrate; a second polarizer disposed at an outer side of the second substrate; and a $\lambda/2$ retarder film bonded to an outer surface of the first substrate first substrate or the second substrate.

A further object of the present invention is to provide a display apparatus comprising a backlight module and a liquid crystal display panel. The liquid or stat display panel comprises: a first substrate comprising a first electrode; a second substrate comprising a second electrode, wherein the second electrode has a pixel electrode structure, and the pixel electrode structure comprises a trunk portion and plurality of branch portions, and there is a predetermined angle between the trunk portion and the branch portions, and the predetermined angle is less than or greater than 45 degrees; a liquid crystal layer formed between the first substrate and the second substrate; a first polarizer disposed at an outer side of the first substrate; a second polarizer disposed at an outer side of the second substrate; and a $\lambda/2$ retarder film bonded to an outer surface of the first substrate first substrate or the second substrate.

In one embodiment of the present invention, the predetermined angle is in the range of 5 degrees to 42.5 degrees.

In one embodiment of the present invention, the predetermined angle is in the range of 47.5 degrees to 85 degrees.

In one embodiment of the present invention, the half wave retarder film is positioned between the first substrate and the first polarizer.

In one embodiment of the present invention, the predetermined angle ($\theta$) is less than 45 degrees, and there is an angle ($\Psi_1$) between a slow axis of the half wave retarder film and an absorption axis of the first polarizer, and the predetermined angle ($\theta$) and the angle ($\Psi_1$) satisfy the following equation:

$$\Psi_1 + \theta = 45°.$$

In one embodiment of the present invention, the predetermined angle ($\theta$) is greater than 45 degrees, and there is an angle ($\Psi_3$) between a slow axis of the half wave retarder film and an absorption axis of the first polarizer, and the predetermined angle ($\theta$) and the angle ($\Psi_3$) satisfy the following equation:

$$\Psi_3 + \theta = 135°.$$

In one embodiment of the present invention, the half wave retarder film is positioned between the second substrate and the second polarizer.

In one embodiment of the present invention, the predetermined angle ($\theta$) is less than 45 degrees, and there is an angle ($\Psi_2$) between a slow axis of the half wave retarder film and an absorption axis of the second polarizer, and the predetermined angle ($\theta$) and the angle ($\Psi_2$) satisfy the following equation:

$$\Psi_2 + \theta = 45°.$$

In one embodiment of the present invention, the predetermined angle (θ) is greater than 45 degrees, and there is an angle ($\Psi_4$) between a slow axis of the half wave retarder film and an absorption axis of the second polarizer, and the predetermined angle (θ) and the angle ($\Psi_4$) satisfy the following equation:

$$\theta - \Psi_4 = 45°.$$

In the LCD panel and the display apparatus using the same of the present invention, with the use of the pixel electrode structure, the color shift problem of the VA type LCD apparatus can be improved. Moreover, the polarized direction and angles of the light rays can be adjusted by the λ/2 retarder film for enhancing the transmittance of the liquid crystal display panel.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
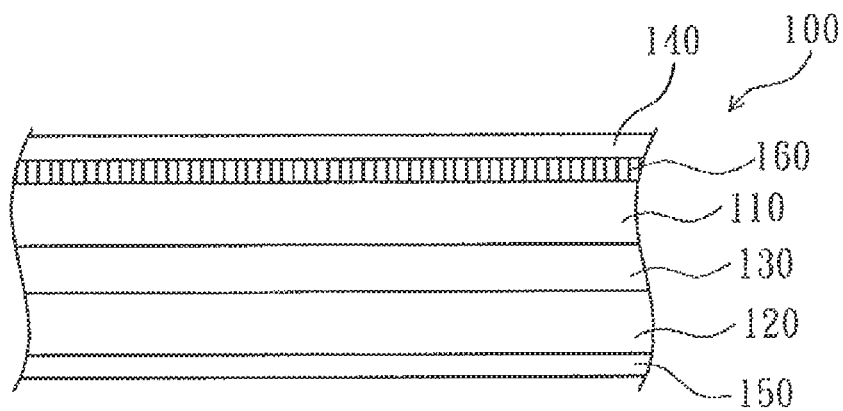
FIG. 1 is a cross-sectional view showing a liquid crystal display panel according to one embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Referring to FIG. 1, a cross-sectional view showing a liquid crystal display (LCD) panel according to one embodiment of the present invention is illustrated. The display apparatus of the present embodiment can comprises the liquid crystal display panel 100 and a backlight module (not shown). The liquid crystal display panel 100 is disposed opposite to the backlight module, and the backlight module may be realized as a side lighting backlight module or a bottom lighting backlight module to provide the liquid crystal display panel 100 with the back-light. The liquid crystal display panel 100 may be a VA type liquid crystal display panel, such as a PSVA type liquid crystal display panel or a pattern vertical alignment (PVA) type liquid crystal display panel.

Referring to FIG. 1 again, the liquid crystal display panel 100 may comprise a first substrate 110, a second substrate 120, a liquid crystal layer 130, a first polarizer 140 and a second polarizer 150 and a half wave (λ/2) retarder film 160. The liquid crystal layer 130 is formed between the first substrate 110 and the second substrate 120. That is, the liquid crystal layer 130 is positioned at inner sides of the first substrate 110 and the second substrate 120. The first polarizer 140 is disposed at an outer side of the first substrate 110, and the second polarizer 150 is disposed at an outer side of the second substrate 120. The λ/2 retarder film 160 can be bonded to an outer surface of the first substrate 110 or the second substrate 120.

Referring to FIG. 1, the first substrate 110 and the second substrate 120 may be realized as glass substrates or flexible plastic substrates. The first substrate 110 may be a glass substrate or other material substrate with color filters (CF), and the second substrate 120 may be a glass substrate or other material substrate with a thin film transistor (TFT) array. It notes that the CF and the TFT array may also be disposed on the same substrate in other embodiments.

Figure 2:
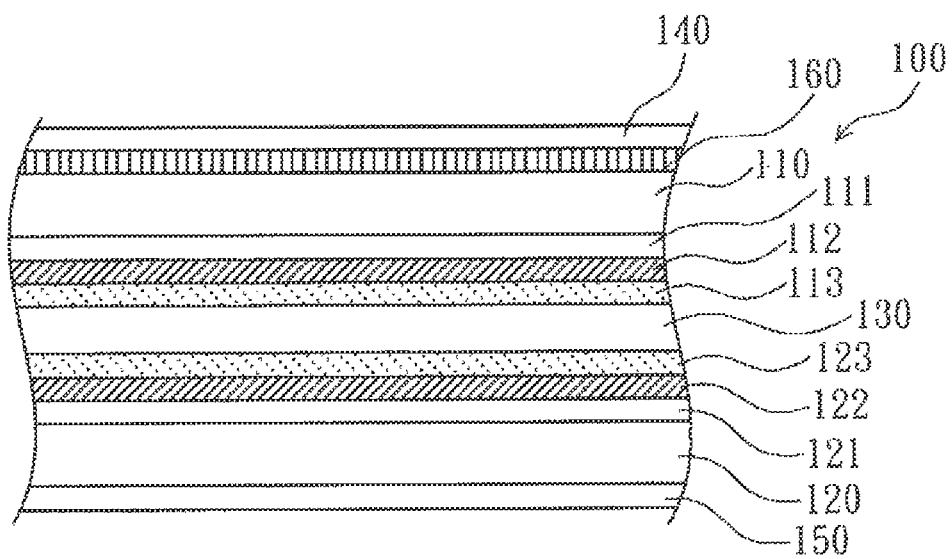
FIG. 2 is a cross-sectional view showing a PSVA type liquid crystal display panel according to one embodiment of the present invention.

Referring to FIG. 2, a cross-sectional view showing a PSVA type liquid crystal display panel according to one embodiment of the present invention is illustrated. In this embodiment, the liquid crystal display panel 100 may be, for example, a PSVA type liquid crystal display panel. At this time, the liquid crystal layer 130 can include reactive monomers and liquid crystal molecules. The reactive monomers are preferably photo-sensitive monomers mixed with the liquid crystal molecules. The first polarizer 140 is disposed on one side of the first substrate 110 and opposite to the liquid crystal layer 130 (i.e. a light-emitting side of the first substrate 110). The second polarizer 150 is disposed on one side of the second substrate 120 and opposite to the liquid crystal layer 130 (i.e. a light-incident side of the second substrate 120).

Referring to FIG. 2 again, when the liquid crystal display panel 100 is the PSVA type liquid crystal display panel, the first substrate 110 can comprise a first electrode 111, a first alignment layer 112 and a first polymer alignment layer 113, and the second substrate 120 can comprise a second electrode 121, a second alignment layer 122 and a second polymer alignment layer 123. The first alignment layer 112 and the first polymer alignment layer 113 are formed on the first electrode 111 in sequence. The second alignment layer 122 and the second polymer alignment layer 123 are formed on the second electrode 121 in sequence. The first electrode 111 and the second electrode 121 are preferably made of a transparent and electrically conductive material, such as ITO, IZO, AZO, GZO, TCO or ZnO. A voltage can be applied to the liquid crystal molecules of the liquid crystal layer 130 by the first electrode 111 and the second electrode 121. In this embodiment, the first electrode 111 may be a common electrode, and the second electrode 121 may be a pixel electrode. In addition, the second electrode 121 can have a plurality of regions, and the voltage applied to each of the regions may be the same or different. The alignment layers 112, 122 and the polymer alignment layers 113, 123 can have an alignment direction for determining the orientation of the liquid crystal molecules of the liquid crystal layer 130. The alignment layers 112, 122 and the polymer alignment layers 113, 123 can have a pre-tilt angle, wherein the pre-tilt angle is less than 90 degrees, preferably less than 60 degrees. The alignment layers 112, 122 are formed on the substrates 110, 120, respectively. The polymer alignment layers 113, 123 are polymerized of the reactive monomers bonded with the alignment layers 112, 122.

Figure 3:
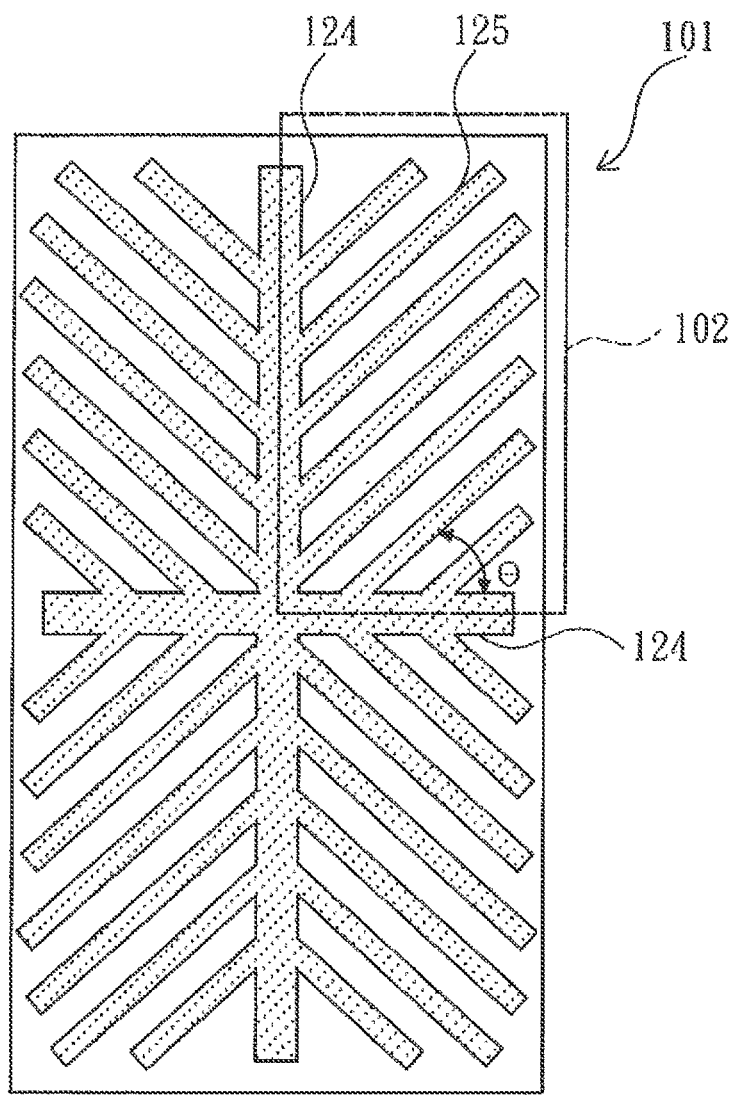
FIG. 3 is a schematic diagram showing a pixel electrode structure of the liquid crystal display panel according to one embodiment of the present invention.

Referring to FIG. 3, a schematic diagram showing a pixel electrode structure of the liquid crystal display panel according to one embodiment of the present invention is illustrated. The second substrate 120 comprises a plurality of signal lines (not shown), such as gate lines and data lines, which are crisscrossed, and thereby form a plurality of pixel regions 101 arranged in an array. In each of the pixel regions 101, the second electrode 121 has a pixel electrode structure (or pixel pattern) for forming a multi-domain alignment. In this embodiment, the second electrode 121 in each of the pixel regions 101 comprises a trunk portion 124 and a plurality of branch portions 125. The trunk portion 124 may be a crisscross pattern, and each of the pixel regions 101 is divided into four sub-pixel regions 102 by the trunk portion 124. In each of the sub-pixel regions 102, the branch portions 125 obliquely extend from the trunk portion 124 and are arranged parallel to each other. In this case, there is a predetermined angle θ between the trunk portion and the branch portions, and the predetermined angle θ is less than or greater than 45 degrees, i.e. not equal to 45 degrees (θ≠45°). For example, the predetermined angle θ may be in the range of 5 degrees to 85 degrees except 45 degrees for improving the color shift problem exiting in the VA type LCD apparatus.

According to an optical theory, when an angle between a tilting direction of the liquid crystal molecules and an absorption axis of the polarizer is 45 degrees, the liquid crystal display panel can have a greatest transmittance. Therefore, in embodiments of the present invention, the transmittance of the liquid crystal display panel 100 is enhanced by adjusting the angle between the tilting direction of the liquid crystal molecules and an absorption axis of the polarizers 140, 150 and the angle between a slow axis of the λ/2 retarder film 160 and the absorption axis of the polarizers 140, 150.

In one embodiment, referring to FIG. 3, the predetermined angle θ between the trunk portion 124 and the branch portions 125 may be less than 45 degrees (θ<45°), such as in the range of 5 degrees to 42.5 degrees, for another example, in the range of 10 degrees to 40 degrees. At this time, the λ/2 retarder film 160 can be bonded to the outer surface of the first substrate 110 or the second substrate 120, so as to adjust polarized angles of the light rays.

Figure 4:
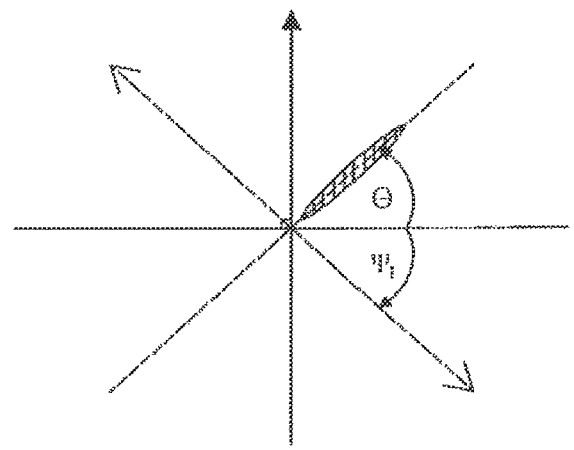
FIG. 4 is a schematic diagram showing different angles according to one embodiment of the present invention.

Referring to FIG. 2 and FIG. 4, FIG. 4 is a schematic diagram showing different angles according to one embodiment of the present invention. When the λ/2 retarder film 160 is bonded to the outer surface of the first substrate 110, the λ/2 retarder film 160 is positioned between the first substrate 110 and the first polarizer 140, and the absorption axis of the first polarizer 140 may be vertical to the absorption axis of the second polarizer 150. That is, an angle between the absorption axes of the first polarizer 140 and the second polarizer 150 is 90 degrees, and there is an angle $\Psi_1$ between the slow axis (C axis) of the λ/2 retarder film 160 and the absorption axis of the first polarizer 140. In this case, the predetermined angle θ (θ<45°) and the angle $\Psi_1$ satisfy the following equation (1):

$$\Psi_1 + \theta = 45°  \quad (1).$$

Figure 5A:
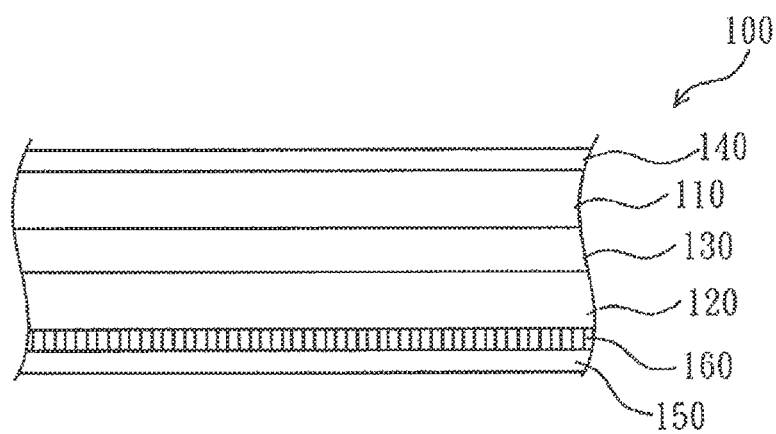
FIG. 5A is a cross-sectional view showing a liquid crystal display panel according to one embodiment of the present invention.
Figure 5B:
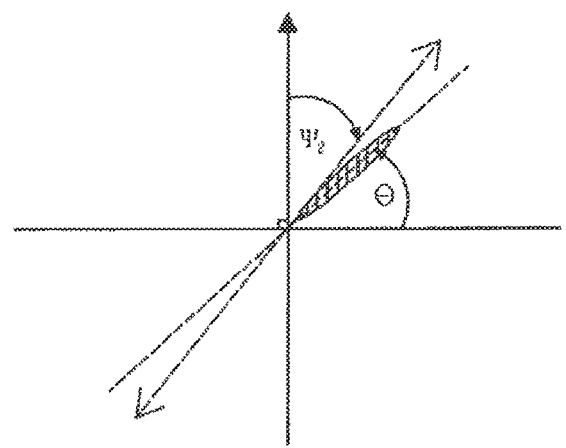
FIG. 5B is a schematic diagram showing different angles according to one embodiment of the present invention.

Referring to FIG. 5A and FIG. 5B, FIG. 5A is a cross-sectional view showing a liquid crystal display panel according to one embodiment of the present invention, and FIG. 5B is a schematic diagram showing different angles according to one embodiment of the present invention, When the λ/2 retarder film 160 is bonded to the outer surface of the second substrate 120, the λ/2 retarder film 160 is positioned between the second substrate 120 and the second polarizer 150, and the absorption axis of the first polarizer 140 may be vertical to the absorption axis of the second polarizer 150. That is, the angle between the absorption axes of the first polarizer 140 and the second polarizer 150 is 90 degrees, and there is an angle $\Psi_2$ between the slow axis of the λ/2 retarder film 160 and the absorption axis of the second polarizer 150. In this case, the predetermined angle θ (θ<45°) and the angle $\Psi_2$ satisfy the following equation (2):

$$\Psi_2 + \theta = 45°  \quad (2).$$

Figure 6:
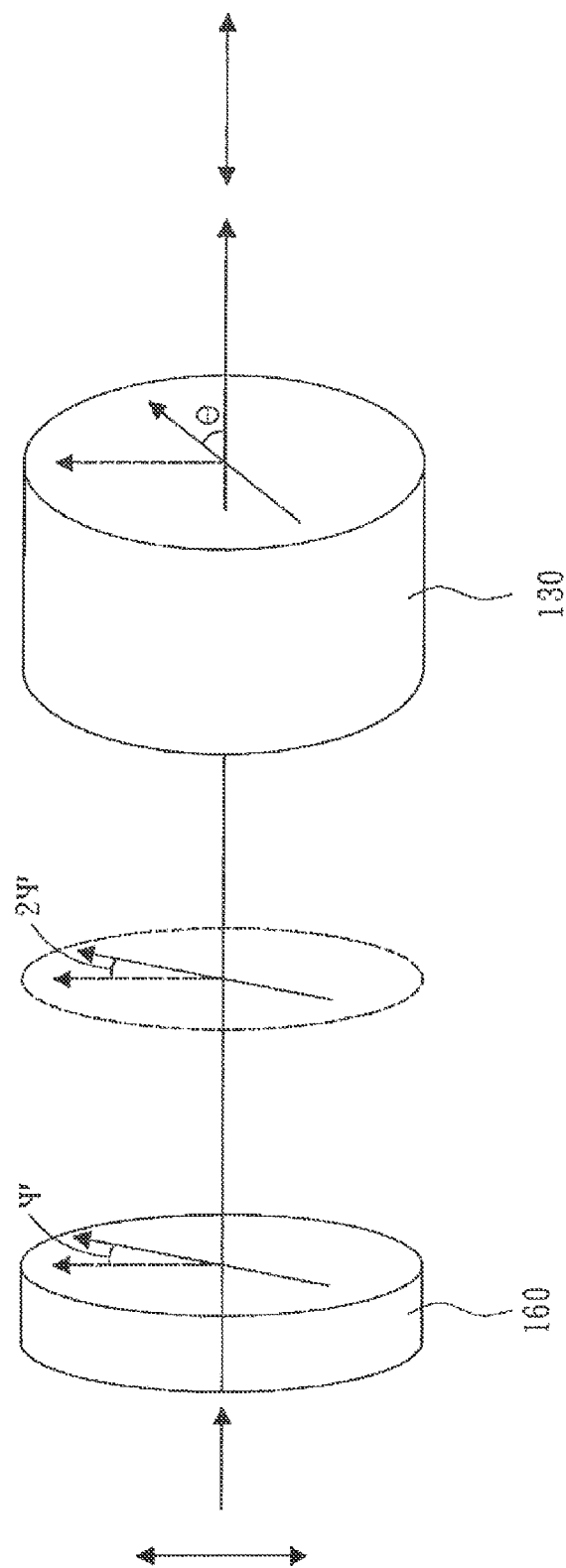
FIG. 6 is a schematic diagram showing polarized light rays according to one embodiment of the present invention.

Referring to FIG. 6, a schematic diagram showing polarized light rays according to one embodiment of the present invention is illustrated. Taking the liquid crystal display panel 100 shown in FIG. 5A for example, when the light rays are emitted from the second polarizer 150 to the first polarizer 140 of the liquid crystal display panel 100, vertically and linearly polarized light rays from the second polarizer 150 are transformed into another kind of linearly polarized light rays by the λ/2 retarder film 160. There is an angle of 2Ψ between the vertically and linearly polarized light rays and the transformed linearly polarized light rays. Subsequently, the transformed linearly polarized light rays are further transformed into horizontally and linearly polarized light rays by the liquid crystal layer 130 (i.e. a liquid crystal cell), so as to allow the light rays to pass a transmission axis of the first polarizer 140. At this time, the liquid crystal layer 130 can be equivalent to a λ/2 retarder film. Therefore, with the use of the λ/2 retarder film 160, the polarized direction and angles of the light rays can be adjusted for enhancing the transmittance of the liquid crystal display panel 100.

Figure 7:
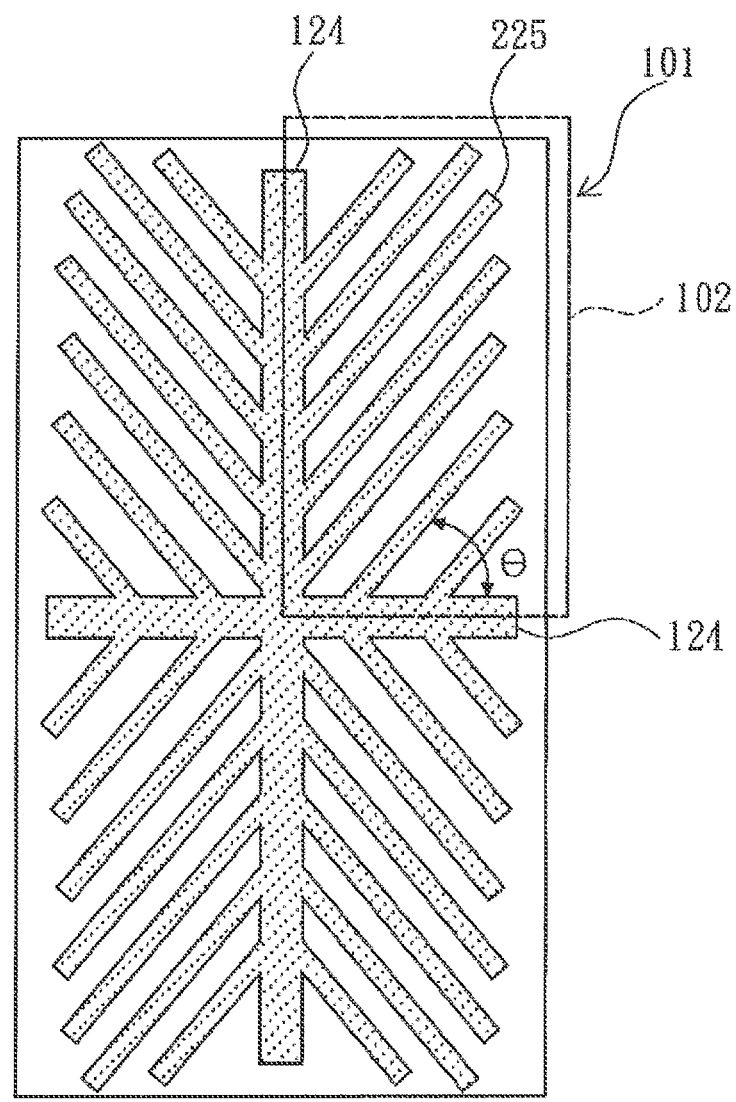
FIG. 7 is a schematic diagram showing a pixel electrode structure of the liquid crystal display panel according to another embodiment of the present invention.

Referring to FIG. 7, a schematic diagram showing a pixel electrode structure of the liquid crystal display panel according to another embodiment of the present invention is illustrated. In another embodiment, the predetermined angle θ between the trunk portion 124 and the branch portions 225 may be greater than 45 degrees (θ>45°), such as in the range of 47.5 degrees to 85 degrees, for another example, in the range of 50 degrees to 80 degrees. At this time, the λ/2 retarder film 160 can be bonded to the outer surface of the first substrate 110 or the second substrate 120, so as to adjust polarized angles of the light rays.

Figure 8A:
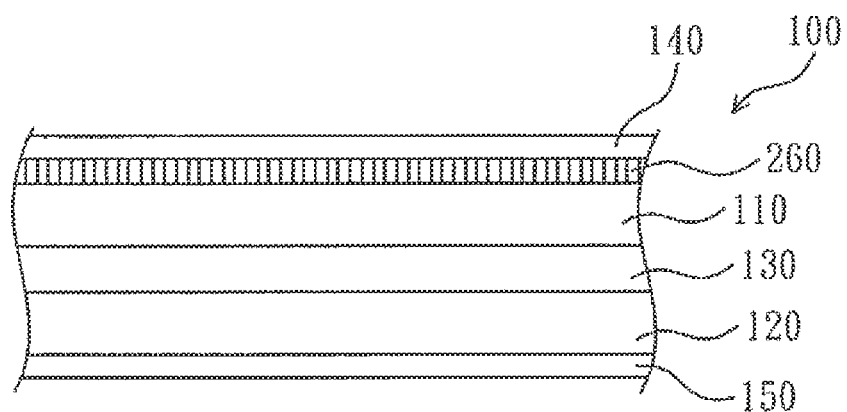
FIG. 8A is a cross-sectional view showing a liquid crystal display panel according to another embodiment of the present invention.
Figure 8B:
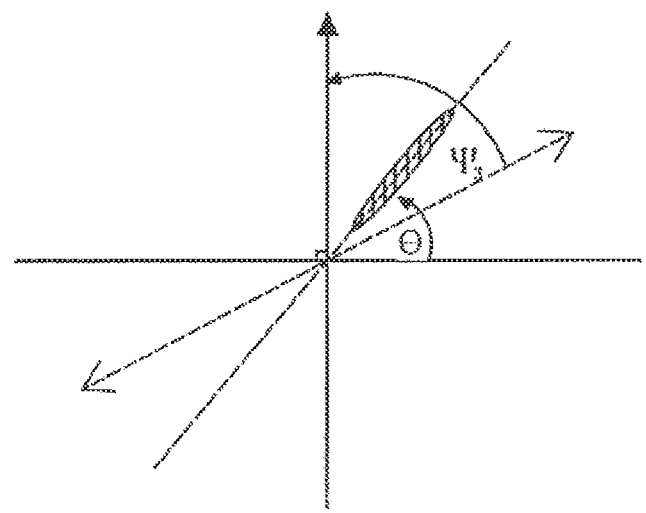
FIG. 8B is a schematic diagram showing different angles according to another embodiment of the present invention.

Referring to FIG. 8A and FIG. 8B, FIG. 8A is a cross-sectional view showing a liquid crystal display panel according to another embodiment of the resent invention, and FIG. 8B is a schematic diagram showing different angles according to another embodiment of the present invention. When the λ/2 retarder film 260 is bonded to the outer surface of the first substrate 110, the λ/2 retarder film 260 is positioned between the first substrate 110 and the first polarizer 140, and the absorption axis of the first polarizer 140 may be vertical to the absorption axis of the second polarizer 150. That is, the angle between the absorption axes of the first polarizer 140 and the second polarizer 158 is 90 degrees, and there is an angle $\Psi_3$ between the slow axis (C axis) of the λ/2 retarder film 260 and the absorption axis of the first polarizer 140. In this case, the predetermined angle θ (θ>45°) and the angle $\Psi_3$ satisfy the following equation (3):

$$\Psi_3+\theta=135° \quad (3).$$

Figure 9A:
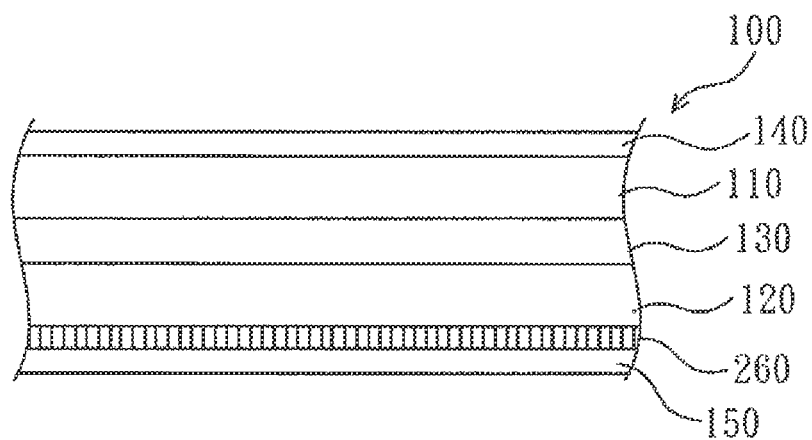
FIG. 9A is a cross-sectional view showing a liquid crystal display panel according to another embodiment of the present invention.
Figure 9B:
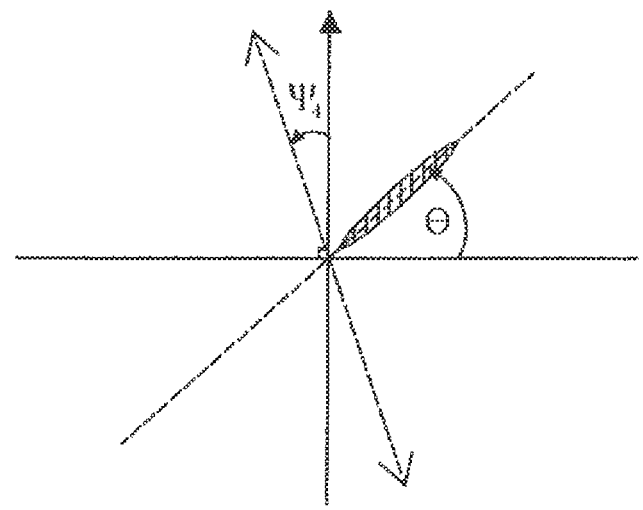
FIG. 9B is a schematic diagram showing different angles according to another embodiment of the present invention.

Referring to FIG. 9A and FIG. 9B, FIG. 9A is a cross-sectional view showing a liquid crystal display panel according to another embodiment of the present invention, and FIG. 9B is a schematic diagram showing different angles according to another embodiment of the present invention. When the λ/2 retarder film 260 is bonded to the outer surface of the second substrate 120, the λ/2 retarder film 260 is positioned between the second substrate 120 and the second polarizer 150, and the absorption axis of the first polarizer 140 may be vertical to the absorption axis of the second polarizer 150. That is, the angle between the absorption axes of the first polarizer 140 and the second polarizer 150 is 90 degrees, and there is an angle $\Psi_4$ between the slow axis of the λ/2 retarder film 260 and the absorption axis of the second polarizer 150. In this case, the predetermined angle θ (θ>45°) and the angle $\Psi_2$ satisfy the following equation (4):

$$\theta-\Psi_4=45° \quad (4).$$

In a further embodiment, the liquid crystal display panel may be, for example, a PVA type liquid crystal display panel. At this time, the polymer alignment layers may be omitted in the liquid crystal display panel.

As described above, in the LCD panel and the display apparatus of the present invention using the same, with the use of the pixel electrode structure, the color shift problem of the VA type LCD apparatus can be improved, Moreover, the polarized direction and angles of the light rays can be adjusted by the λ/2 retarder film for enhancing the transmittance of the liquid crystal display panel. Therefore, in the LCD panel and the display apparatus of the present invention using the same, the color shift problem of the LCD panel can be improved, and the transmittance thereof can be enhanced.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A liquid crystal display panel comprising:
a first substrate comprising a first electrode;
a second substrate comprising a second electrode, wherein the second electrode has a pixel electrode structure, and the pixel electrode structure comprises a trunk portion and plurality of branch portions, and there is a predetermined angle between the trunk portion and the branch portions, and the predetermined angle is in the range of 5 degrees to 85 degrees except 45 degrees;
a liquid crystal layer formed between the first substrate and the second substrate;
a first polarizer disposed at an outer side of the first substrate;
a second polarizer disposed at an outer side of the second substrate; and
a half wave (λ/2) retarder film positioned between the second substrate and the second polarizer;
wherein, when the predetermined angle (θ) is less than 45 degrees, and there is an angle ($\Psi_2$) between a slow axis of the half wave retarder film and an absorption axis of the second polarizer, and the predetermined angle (θ) and the angle ($\Psi_2$) satisfy the following equation:

$$\Psi_2+\theta=45°;$$

wherein, when the predetermined angle (θ) is greater than 45 degrees, and there is an angle ($\Psi_4$) between a slow axis of the half wave retarder film and an absorption axis of the second polarizer, and the predetermined angle (θ) and the angle ($\Psi_4$) satisfy the following equation:

$$\theta\Psi_4=45°.$$

2. The liquid crystal display panel according to claim 1, wherein the predetermined angle is in the range of 5 degrees to 42.5 degrees.

3. The liquid crystal display panel according to claim 1, wherein the predetermined angle is in the range of 47.5 degrees to 85 degrees.

4. A liquid crystal display panel comprising:
a first substrate comprising a first electrode;
a second substrate comprising a second electrode, wherein the second electrode has a pixel electrode structure, and the pixel electrode structure comprises a trunk portion and plurality of branch portions, and there is a predetermined angle between the trunk portion and the branch portions, and the predetermined angle is less than or greater than 45 degrees;
a liquid crystal layer formed between the first substrate and the second substrate;
a first polarizer disposed at an outer side of the first substrate;
a second polarizer disposed at an outer side of the second substrate; and
a half wave retarder film positioned between the second substrate and the second polarizer;
wherein, when the predetermined angle (θ) is less than 45 degrees, and there is an angle ($\Psi_2$) between a slow axis of the half wave retarder film and an absorption axis of the second polarizer, and the predetermined angle (θ) and the angle ($\Psi_2$) satisfy the following equation:

$$\Psi_2+\theta=45°;$$

wherein, when the predetermined angle (θ) is greater than 45 degrees, and there is an angle ($\Psi_4$) between a slow axis of the half wave retarder film and an absorption axis of the second polarizer, and the predetermined angle (θ) and the angle ($\Psi_4$) satisfy the following equation:

$$\theta-\Psi_4=45°.$$

5. The liquid crystal display panel according to claim 4, wherein the predetermined angle is in the range of 5 degrees to 42.5 degrees.

6. The liquid crystal display panel according to claim 4, wherein the predetermined angle is in the range of 47.5 degrees to 86 degrees.

7. A display apparatus comprising:
a backlight module; and
a liquid crystal display panel comprising:
a first substrate comprising a first electrode;
a second substrate comprising a second electrode, wherein the second electrode has a pixel electrode structure, and the pixel electrode structure comprises a trunk portion and plurality of branch portions, and there is a predetermined angle between the trunk portion and the branch portions, and the predetermined angle is less than or greater than 45 degrees;

a liquid crystal layer formed between the first substrate and the second substrate;

a first polarizer disposed at an outer side of the first substrate;

a second polarizer disposed at an outer side of the second substrate; and a half wave retarder film positioned between the second substrate and the second polarizer;

wherein, when the predetermined angle ($\theta$) is less than 45 degrees, and there is an angle ($\Psi_2$) between a slow axis of the half wave retarder film and an absorption axis of the second polarizer, and the predetermined angle ($\theta$) and the angle ($\Psi_2$) satisfy the following equation:

$\Psi_2+\theta=45°$;

wherein, when the predetermined angle ($\theta$) is greater than 45 degrees, and there is an angle ($\Psi_4$) between a slow axis of the half wave retarder film and an absorption axis of the second polarizer, and the predetermined angle ($\theta$) and the angle ($\Psi_4$) satisfy the following equation:

$\theta-\Psi_4=45°$.

* * * * *

UNITED STATES PATENT AND TRADEMARK OFFICE
CERTIFICATE OF CORRECTION

| | | |
|---|---|---|
| PATENT NO. | : 9,720,276 B2 | Page 1 of 1 |
| APPLICATION NO. | : 14/723464 | |
| DATED | : August 1, 2017 | |
| INVENTOR(S) | : Chihtsung Kang | |

It is certified that error appears in the above-identified patent and that said Letters Patent is hereby corrected as shown below:

In the Claims

Claim 6, Column 8 should be corrected as follows:
Line 59: Change:
-- 86 degrees --
To:
"85 degrees"

Signed and Sealed this
Third Day of October, 2017

Joseph Matal
*Performing the Functions and Duties of the*
*Under Secretary of Commerce for Intellectual Property and*
*Director of the United States Patent and Trademark Office*